United States Patent
Eilertsen et al.

(10) Patent No.: US 10,242,808 B2
(45) Date of Patent: Mar. 26, 2019

(54) METHODS AND APPARATUS RELATED TO A PURGE VALVE FOR A CAPACITOR

(71) Applicant: Ioxus, Inc., Oneonta, NY (US)

(72) Inventors: Thor E. Eilertsen, Oneonta, NY (US); Chad Hall, Walton, NY (US); Lothar Franz Bieg, Albuquerque, NM (US)

(73) Assignee: IOXUS, INC., Oneonta, NY (US)

( * ) Notice: Subject to any disclaimer, the term of this patent is extended or adjusted under 35 U.S.C. 154(b) by 0 days.

(21) Appl. No.: 14/282,690

(22) Filed: May 20, 2014

(65) Prior Publication Data

US 2015/0029639 A1    Jan. 29, 2015

Related U.S. Application Data

(63) Continuation of application No. 12/878,330, filed on Sep. 9, 2010, now Pat. No. 8,760,850.

(51) Int. Cl.
*H01G 9/00* (2006.01)
*H01G 11/14* (2013.01)
(Continued)

(52) U.S. Cl.
CPC ............. *H01G 11/14* (2013.01); *F16K 15/04* (2013.01); *H01G 9/12* (2013.01); *H01G 11/20* (2013.01); *H01G 11/78* (2013.01); *H01G 11/80* (2013.01); *Y02E 60/13* (2013.01); *Y10T 137/7855* (2015.04); *Y10T 137/7858* (2015.04); *Y10T 137/7873* (2015.04); *Y10T 137/7904* (2015.04)

(58) Field of Classification Search
CPC .......... Y02E 60/12; Y02E 60/13; H01M 2/12; H01M 2/1223; H01M 10/5073; H01M 10/52; H01M 2/1205

USPC .... 361/521, 517, 502, 519, 272; 429/53–56; 137/519.5, 515.3–516
See application file for complete search history.

(56) References Cited

U.S. PATENT DOCUMENTS 3,494,400 A * 2/1970 McCoy .................. F16B 39/24
                                                    411/150
3,651,618 A * 3/1972 Klein .................... B01D 53/226
                                                      95/44

(Continued)

FOREIGN PATENT DOCUMENTS

| WO | WO 2007/072815 | 6/2007 |
| WO | WO 2008/110251 | 9/2008 |
| WO | WO 2015/006072 | 1/2015 |

OTHER PUBLICATIONS

Office Action for U.S. Appl. No. 12/878,330, dated Sep. 12, 2013, 11 pages.

*Primary Examiner* — Jayprakash N Gandhi
*Assistant Examiner* — Hung Dang
(74) *Attorney, Agent, or Firm* — Cooley LLP

(57) ABSTRACT

In some embodiments, an apparatus includes a housing and a purge valve. The housing defines a cavity and a lumen extending from a volume of the cavity to a volume outside the cavity. The purge valve is disposed within the lumen and includes an occlusion member. A portion of the occlusion member has a width substantially equal to a width of an end portion of the lumen such that the portion of the occlusion member is disposed within the end portion of the lumen when the purge valve is in a first configuration. The portion of the occlusion member being disposed outside the end portion of the lumen when the purge valve is in a second configuration.

26 Claims, 5 Drawing Sheets

(51) Int. Cl.
*H01G 9/12* (2006.01)
*H01G 11/20* (2013.01)
*H01G 11/80* (2013.01)
*F16K 15/04* (2006.01)
*H01G 11/78* (2013.01)

(56) References Cited

U.S. PATENT DOCUMENTS

| | | | |
|---|---|---|---|
| 3,909,302 | A | 9/1975 | Mermelstein |
| 3,952,233 | A | 4/1976 | Deckert |
| 4,245,277 | A | 1/1981 | van Gils et al. |
| 4,296,186 | A | 10/1981 | Wolf |
| 4,904,520 | A | 2/1990 | Dumas et al. |
| 5,019,422 | A | 5/1991 | Rose et al. |
| 5,981,099 | A * | 11/1999 | Bourbeau ............ H01M 2/1205 429/53 |
| 6,135,144 | A * | 10/2000 | Rozek .................. F04B 49/225 137/540 |
| 6,456,484 | B1 | 9/2002 | Matsuoka et al. |
| 6,880,576 | B2 * | 4/2005 | Karp .................... B01F 5/0471 137/806 |
| 7,394,648 | B2 | 7/2008 | Kondo et al. |
| 8,760,850 | B2 | 6/2014 | Eilertsen et al. |
| 2004/0193265 | A1 * | 9/2004 | Seder .................... A61F 2/203 623/9 |
| 2005/0039806 | A1 | 2/2005 | Nakayama et al. |
| 2005/0152091 | A1 | 7/2005 | Okamura et al. |
| 2007/0219497 | A1 | 9/2007 | Johnson et al. |
| 2009/0141420 | A1 | 6/2009 | Bourcier et al. |
| 2009/0147441 | A1 * | 6/2009 | Yoshida et al. ............... 361/502 |
| 2010/0053844 | A1 | 3/2010 | Eilertsen |
| 2010/0266878 | A1 | 10/2010 | Eilertsen |

\* cited by examiner

METHODS AND APPARATUS RELATED TO A PURGE VALVE FOR A CAPACITOR

CROSS-REFERENCE TO RELATED APPLICATIONS

This application is a continuation of U.S. patent application Ser. No. 12/878,330, filed Sep. 9, 2010, now U.S. Pat. No. 8,760,850, entitled "METHODS AND APPARATUS RELATED TO A PURGE VALVE FOR A CAPACITOR," the disclosure of which is hereby incorporated by reference in its-entirety.

BACKGROUND

Embodiments described herein relate generally to purge values, and, in particular, to purge valves for use in capacitors.

During operation, pressure buildup can occur within a housing of known energy storage devices, such as electrochemical double layer capacitors (EDLCs) and pseudocapacitors. Such pressure can result from, for example, ripple voltage or over voltage. Some known EDLCs and pseudocapacitors are fitted with a burst disk that opens and/or bursts when excessive pressure develops within the housing. For example, some known burst disks open when a pressure within the housing exceeds 100 psi. Known EDLCs and pseudocapacitors include burst disks as a safety measure to prevent the housing from rupturing due to excessive pressure.

Once a burst disk opens and/or bursts, exposure to the surrounding atmosphere can cause the EDLC or pseudocapacitor to rapidly deteriorate. Such deterioration reduces the effectiveness and the life of the energy storage device. As such, once the burst disk is opened, the EDLC or pseudocapacitor should be replaced as soon as possible.

Thus, a need exists for methods and apparatus related to a purge valve that releases pressure within a housing of an energy storage device when excessive pressure develops within the housing but prevents and/or minimizes the deterioration of the energy storage device due to exposure to the surrounding atmosphere.

SUMMARY OF THE INVENTION

In some embodiments, an apparatus includes a housing and a purge valve. The housing defines a cavity and a lumen extending from a volume of the cavity to a volume outside the cavity. The purge valve is disposed within the lumen and includes an occlusion member. A portion of the occlusion member has a width substantially equal to a width of an end portion of the lumen such that the portion of the occlusion member is disposed within the end portion of the lumen when the purge valve is in a first configuration. The portion of the occlusion member being disposed outside the end portion of the lumen when the purge valve is in a second configuration.

DETAILED DESCRIPTION

Figure 1:
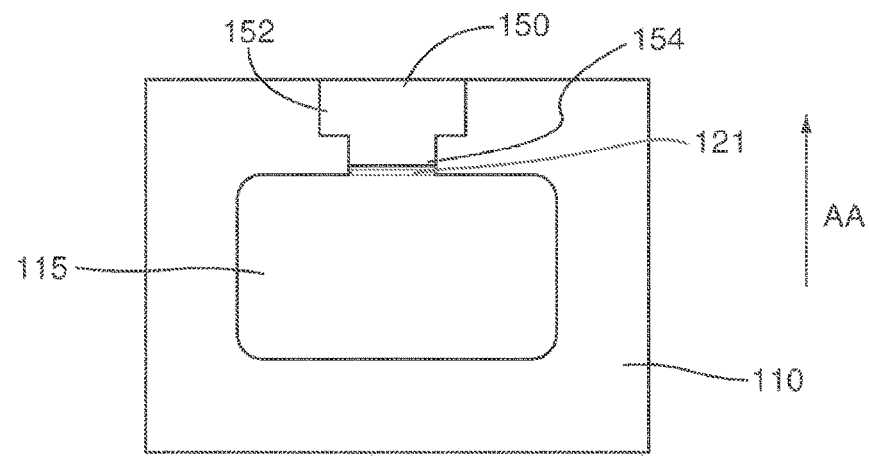
FIGS. 1 and 2 are schematic illustrations of a capacitor housing having a purge valve in a first position and a second position, respectively, according to an embodiment.

In some embodiments, an apparatus includes a housing and a purge valve. The housing defines a cavity and a lumen extending from a volume of the cavity to a volume outside the cavity. The purge valve is disposed within the lumen and includes an occlusion member. A portion of the occlusion member has a width substantially equal to a width of an end portion of the lumen such that the portion of the occlusion member is disposed within the end portion of the lumen when the purge valve is in a first configuration. The portion of the occlusion member being disposed outside the end portion of the lumen when the purge valve is in a second configuration.

In some embodiments, the purge valve can move between its first configuration and its second configuration as needed. For example, the occlusion member can pneumatically isolate the volume of the cavity from the volume outside the cavity when the purge valve is in the first configuration such that pressure can develop, accumulate and/or build-up within the cavity. When a pressure within the cavity is greater than a predetermined pressure threshold, the purge valve can move from its first configuration to its second configuration to release the pressure. Similarly, when the pressure within the cavity is reduced to be less than the predetermined pressure threshold, the purge valve can move from its second configuration to its first configuration to once again pneumatically isolate the volume of the cavity from the volume outside the cavity.

In some embodiments, an apparatus includes an occlusion member, at least one biased member, and an adjustable member. The occlusion member is disposed within a lumen of a housing and is configured to pneumatically isolate a volume defined by the housing with a volume outside the housing when in a first position. The occlusion member is substantially aligned along a longitudinal axis defined by the lumen of the housing. The at least one biased member is disposed adjacent to the occlusion member and is configured to bias the occlusion member in its first position. The at least one biased member defines a lumen substantially aligned along the longitudinal axis. The adjustable member is configured to retain the occlusion member and the at least one biased member within the lumen of the housing. The adjustable member defines a lumen substantially aligned along the longitudinal axis. The volume defined by the housing is in pneumatic communication with the volume outside the housing via the lumen of the at least one biased member and the lumen of the adjustable member when the occlusion member is in a second position.

In some embodiments, an apparatus includes a housing defining a cavity and a lumen, at least one capacitor disposed within the cavity of the housing, and a purge valve having a threaded portion. The purge valve is disposed within the lumen when in a first configuration. The purge valve is configured to pneumatically isolate a volume defined by the cavity from a volume outside the housing when the purge valve is in the first configuration and a pressure within the cavity is less than a predetermined pressure. The volume defined by the cavity is in pneumatic communication with the volume outside the housing when the purge valve is in a second configuration. The purge valve can be moved from its first configuration to its second configuration by unscrewing the threaded portion from the housing.

Figure 2:
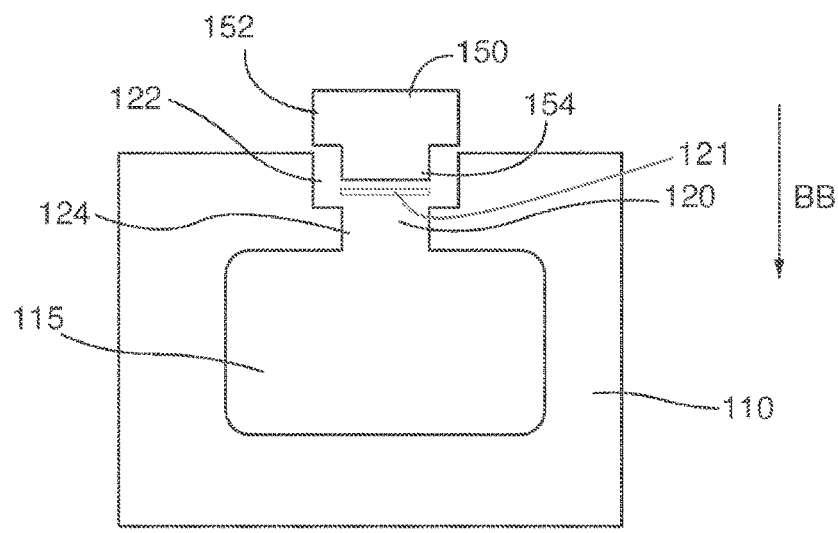

FIGS. 1 and 2 are schematic illustrations of a capacitor housing 110 having a purge valve 150 in a first position and a second position, respectively, according to an embodiment. The capacitor housing 110 can be any suitable housing in which at least one capacitor can be disposed, as further described in detail herein. In some embodiments, for example, the housing can be constructed of a metal (e.g., aluminum), plastics, polymers, resins, or combinations thereof, such as, for example, polycarbonate, polyethylene, or polypropylene. In some embodiments, the capacitor housing 110 can be constructed similar to the cases shown and described in co-pending U.S. patent application Ser. No. 12/424,830, filed Apr. 16, 2009, and entitled "Prismatic Polymer Case for Electrochemical Devices," the disclosure of which is incorporated herein by reference in its entirety.

The capacitor housing 110 defines a cavity 115 and a lumen 120. The cavity 115 is configured to contain and/or store at least one capacitor. In some embodiments, for example, multiple electrochemical double layer capacitors (EDLCs) and/or multiple pseudocapacitors can be disposed within the cavity 115. More specifically, multiple electrodes and/or electrolyte can be stored within the cavity 115. Such EDLCs and/or pseudocapacitors can be electrically coupled in series to increase the output voltage and/or in parallel to reduce the effective series resistance (ESR) and increase the power density of the device. In some embodiments, the capacitors can be similar to the capacitors shown and described in co-pending U.S. patent application Ser. No. 12/229,922, filed Aug. 28, 2008, and entitled "High Voltage EDLC Cell and Method for the Manufacture Thereof," the disclosure of which is incorporated herein by reference in its entirety. In some embodiments, the housing can also include an anode and a cathode (not shown in FIG. 1 or 2) electrically coupled to the electrodes of the capacitors within the capacitor housing 110 to provide power to a load and/or a device.

The lumen 120 extends from the cavity 115 to a volume outside the capacitor housing 110. Similarly stated, the lumen 120 pneumatically couples the cavity 115 with a volume surrounding the capacitor housing 110 and/or a volume outside the capacitor housing. As such, the pressure within the cavity 115 can be equalized with the pressure outside the capacitor housing 110 via the lumen 120. More specifically, through the lumen 120, the pressure within the cavity 115 can be equalized with atmospheric pressure.

The lumen 120 includes a first end portion 122 and a second end portion 124. As shown in FIGS. 1 and 2, the first end portion 122 has a width greater than the second end portion 124. As discussed in further detail herein, this allows the purge valve 150 to fit within the lumen 120.

In some embodiments, a semi-permeable material 121 can be disposed in the lumen 120 or positioned in the capacitor housing 110 covering the second end portion 124 of the lumen 120. The semi-permeable material 121 can allow certain gases produced in the capacitor housing 110 during periods of rapid charging or overcharging to pass through while being hydrophobic and substantially impermeable to liquid electrolyte so that the capacitor will not leak via the purge valve 150. The semi-permeable material 121 can be formulated to resist chemical degradation from contact with the electrolyte.

The semi-permeable material 121 can be configured to allow certain gases (e.g., hydrogen and oxygen) to pass therethrough, while preventing liquids and/or higher molecular weight or toxic gases from escaping the capacitor. For example, the semi-permeable material 121 can be made from a microporous polytetrafluorethylene sheet or sheets with a porosity that allows certain gases to pass therethrough, while preventing liquids and/or other gases from escaping through the purge valve 150. In some embodiments, the semi-permeable material 121 can be made from a polytetrafluoroethylene sheet having an average pore size in the range from about 2 to about 10 microns (preferably from about 5 to about 10 microns), and a thickness in the range of 0.005 to 0.030 inches. Such a semi-permeable material 121 has been found to permit relatively rapid venting of oxygen and hydrogen gas, and to be highly resistant to attack by electrolytes. Additionally, and depending upon pore size, it is substantially impermeable or only slightly permeable to electrolytes normally employed in EDLCs.

The purge valve 150 can be any suitable structure configured to fit within the lumen 120. As shown in FIGS. 1 and 2, the purge valve 150 includes a first end portion 152 and a second end portion 154. In some embodiments, the first end portion 152 can have a width substantially equal to the first end portion 122 of the lumen 120 and the second end portion 154 can have a width substantially equal to the second end portion 124 of the lumen 120. This allows the purge valve 150 to fit within the lumen 120. For example, as shown in FIG. 1, the first end portion 152 of the purge valve 150 can be complementary to the first end portion 122 of the lumen 120. Similarly, the second end portion 154 of the purge valve 150 can be complementary to the second end portion 124 of the lumen 120. Similarly stated, the purge valve 150 can fit snugly and/or tightly within the lumen 120. As such, when the purge valve 150 is positioned within the lumen 120 in its first position (FIG. 1), the cavity 115 is pneumatically isolated from the volume surrounding and/or outside the capacitor housing 110. Said another way, the cavity 115 is pneumatically isolated from atmospheric pressure when the purge valve 150 is in its first position.

The purge valve 150 has a first position (FIG. 1) and a second position (FIG. 2). As discussed above, when the purge valve 150 is in its first position (FIG. 1), the purge valve 150 fits snugly and/or tightly within the lumen 120. Additionally, when the purge valve is in its first position, the cavity 115 is pneumatically isolated from the volume surrounding and/or outside the capacitor housing 110 (e.g., pneumatically isolated from atmospheric pressure). Accordingly, pressure within the cavity can accumulate, build-up and/or develop. Additionally, the electrodes and/or electrolyte that define the capacitors within the cavity 115 are pneumatically isolated from the volume surrounding and/or outside the capacitor housing 110 when the purge valve 150 is in its first position. Thus, the capacitors are not exposed to the surrounding atmosphere.

The purge valve 150 is biased in its first position (FIG. 1). Similarly stated, during normal operation, the purge valve 150 is in its first position. Accordingly, during normal operation, the electrodes and/or electrolyte disposed within the cavity 115 are pneumatically isolated from the volume surrounding the housing 110. This prevents the electrodes and electrolyte from deteriorating during normal operation.

When the purge valve 150 is in its second position (FIG. 2), the purge valve 150 is not completely disposed within the lumen 120. As such, an air passage and/or a pneumatic path is defined through the lumen 120 between the cavity 115 and the volume surrounding the housing 110. Similarly stated, the cavity is in pneumatic communication with the volume surrounding and/or outside the housing 110. Accordingly, pressure within the cavity can be equalized with the pressure surrounding and/or outside the housing 110 (e.g., atmospheric pressure) when the purge valve 150 is in its second position. This can reduce and/or release pressure built-up within the cavity 115.

The purge valve 150 moves from its first position (FIG. 1) to its second position (FIG. 2) when a pressure within the cavity 115 exceeds a first predetermined pressure threshold. More particularly, when the pressure within the cavity 115 exceeds the first predetermined pressure threshold, the pressure can cause the purge valve to move in the direction shown by the arrow AA in FIG. 1. Similarly stated, the pressure within the cavity 115 can exert a force on the purge valve 150 in the direction shown by the arrow AA in FIG. 1. This force causes the purge valve to move into its second position (FIG. 2). In some embodiments, such a first predetermined pressure threshold can be between 103-110 pounds per square inch (psi). In other embodiments, the first predetermined pressure threshold can be less than 103 psi. In still other embodiments, the first predetermined pressure threshold can be greater than 110 psi.

While the purge valve 150 is in its second position (FIG. 2), the pressure within the cavity 115 can be reduced and/or released via the air passage and/or pneumatic path. More specifically, the pressure within the cavity 115 can be released into the volume surrounding and/or outside the capacitor housing 110. Similarly stated, the pneumatic communication between the cavity 115 and the surrounding atmosphere can reduce the pressure within the cavity 115.

After the pressure within the cavity 115 falls below a second predetermined pressure threshold, the purge valve 150 can move from its second position (FIG. 2) to its first position (FIG. 1). More specifically, after the pressure within the cavity 115 falls below the second predetermined threshold, the force exerted by the pressure within the cavity 115 on the purge valve 150 in the direction shown by the arrow AA in FIG. 1 is no longer large enough to retain the purge valve 150 in its second position. Accordingly, the purge valve 150 moves in the direction shown by the arrow BB in FIG. 2 to its first configuration (FIG. 1). Accordingly, the air passage and/or pneumatic path between the cavity 115 and the surrounding atmosphere is sealed and/or closed and the cavity is pneumatically isolated from the surrounding atmosphere.

In some embodiments, the second predetermined pressure threshold can be substantially equal to the first predetermined pressure threshold. In such embodiments, the purge valve 150 moves from the first position to the second position and the second position to the first position at substantially the same predetermined pressure threshold. In other embodiments, the second predetermined pressure threshold is less than the first predetermined pressure threshold. This allows the pressure within the cavity 115 to fall a predetermined amount of pressure below the first predetermined pressure threshold before the purge valve 150 is moved from its second position to its first position. This helps to ensure that the purge valve 150 is not frequently moving between its first position and its second position. Similarly stated, in such embodiments, after the purge valve 150 is moved from its second position to its first position, the pressure within the cavity can increase an amount before the purge valve 150 again moves from the first position to the second position. Such embodiments can be said to include a hysteric effect.

Such a resealable purge valve 150 can be used to release the pressure within the cavity 115 without exposing the contents of the cavity (e.g., the electrodes and the electrolyte of the capacitors) to the surrounding atmosphere for prolonged periods of time. Accordingly, the capacitors within the housing 110 can be operational and/or used for longer periods of time after the purge valve 150 releases the pressure within the cavity 115 than capacitors within housings without a resealable purge valve. Specifically, the capacitors within a housing 110 having a resealable purge valve 150 can be exposed to the surrounding atmosphere less than capacitors within a housing without a resealable purge valve. Accordingly, less degradation occurs in capacitors within a housing 110 having a resealable purge valve 150.

Additionally, such a resealable purge valve 150 allows the pressure within the cavity 115 to be released more than once. For example, if after the purge valve 150 is moved from its second position (FIG. 2) to its first position (FIG. 1) the pressure within the cavity 115 exceeds the first predetermined pressure threshold, the purge valve 150 can once again move from its first position to its second position to release the pressure within the cavity 150. This cycle can occur any number of times. This extends the life and use of the capacitors disposed within the housing 110.

Figure 3:
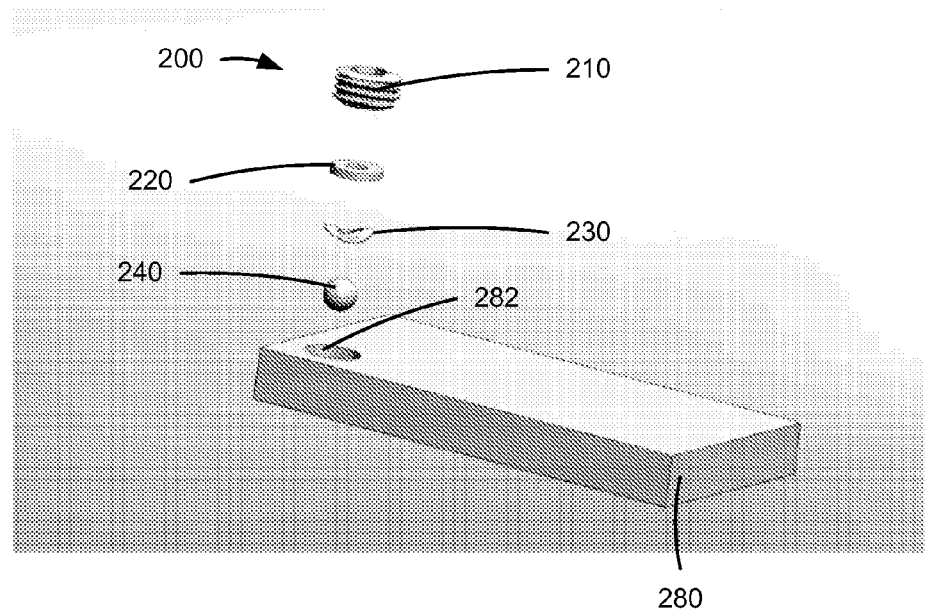
FIG. 3 is an exploded view of a capacitor housing and a purge valve, according to another embodiment.
Figure 4:
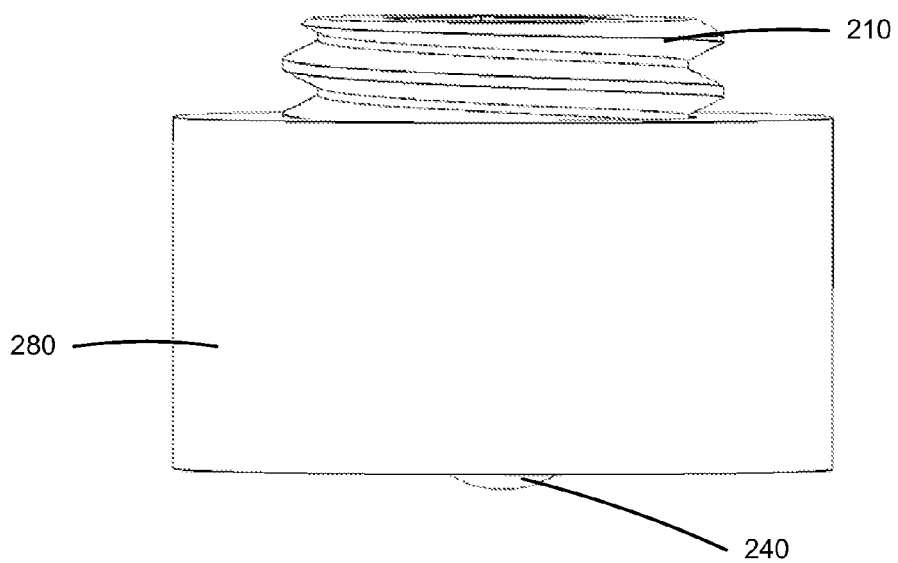
FIG. 4 is a front view of the purge valve shown in FIG. 3.

FIGS. 3-7 illustrate a resealable purge valve 200, according to another embodiment. Specifically, FIG. 3 is an exploded view of a capacitor housing 280 and a purge valve 200, according to another embodiment. The capacitor housing 280 can be any suitable capacitor housing defining a cavity (not shown) and a lumen 282. As such, the capacitor housing can be similar to the capacitor housing 110.

Similar to the cavity 115 defined by capacitor housing 110, the cavity (not shown) defined by the capacitor housing 280 can include one or more capacitors. In some embodiments, for example, multiple electrochemical double layer capacitors (EDLCs) and/or multiple pseudocapacitors can be disposed within the cavity. More specifically, electrolyte and/or multiple electrodes can be stored within the cavity. Such EDLCs and/or pseudocapacitors can be electrically coupled in series to increase the output voltage and/or in parallel to reduce the effective series resistance (ESR) and increase the power density of the device. In some embodiments, the housing can also include an anode and a cathode (not shown) electrically coupled to the electrodes of the capacitors within the capacitor housing 280 to provide power to a load and/or a device.

Similar to the lumen 120, the lumen 282 can pneumatically couple the cavity within the housing 280 with a volume surrounding the housing 282. Similarly stated, the cavity can be in pneumatic communication with a surrounding atmosphere via the lumen 282. Accordingly, a pressure within the cavity can be equalized with atmospheric pressure via the lumen 282. Similarly stated, a pressure within the cavity can be reduced and/or released via the lumen 282.

Figure 5:
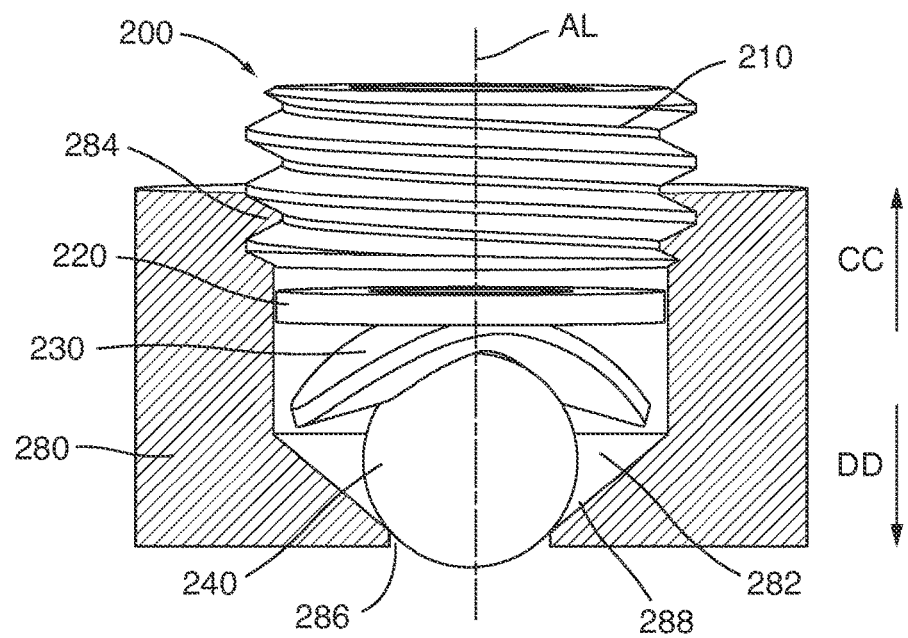
FIG. 5 is a front view of the purge valve shown in FIG. 3 with the capacitor housing shown transparent.
Figure 6:
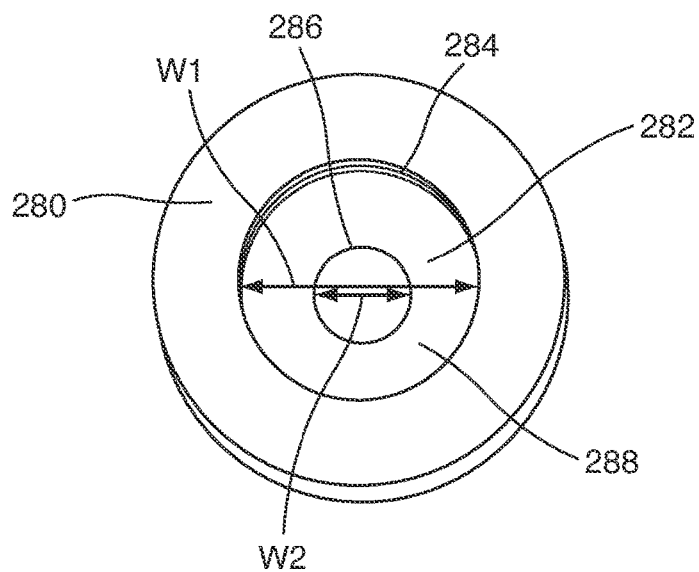
FIG. 6 is a top view of a lumen of the capacitor housing shown in FIG. 3.

FIGS. 5 and 6 illustrate the lumen 282 in greater detail. The lumen 282 includes a first end portion 284, a second end portion 286 and a tapered portion 288. As shown in FIG. 6, the first end portion 284 has a first width W1 and the second end portion 286 has a second width W2, less than the first width W1. As shown in FIG. 5 and as described in further detail herein, the first end portion 284 is configured to receive an adjustable member 210 of the purge valve 200. As such, the adjustable member 210 is configured to be releasably coupled to the first end portion 284 of the lumen 282. In some embodiments, for example, a sidewall of the first end portion of the lumen includes a threaded portion configured to matingly receive a threaded portion of the adjustable member 210, as further described herein. In other embodiments, the first end portion 284 of the lumen can include any other type of connector to matingly receive the adjustable member 210.

As shown and described in FIG. 5 and as described in further detail herein, the second end portion 286 of the lumen 282 is configured to receive an occlusion member 240 of the purge valve 200. As described in further detail herein, the occlusion member 240 is configured to be disposed within the second end portion 286 of the lumen 282 when in a first position. When in the first position, the occlusion member 240 defines a pneumatic seal with the second end portion 286. Similarly stated, the occlusion member 240 pneumatically isolates the lumen 282 from the cavity (not shown) when disposed within the second end portion 286 of the lumen 282.

The tapered portion 288 of the lumen 282 is disposed between the first end portion 284 of the lumen 282 and the second end portion 286 of the lumen. The tapered portion 288 is effective to properly reseat the occlusion member 240 in the second end portion 286 of the lumen 282 when the occlusion member 240 is moved from its second position to its first position, as described in further detail herein. Similarly stated, the tapered portion 288 can facilitate/help guide and/or direct the occlusion member 240 into its first position.

The purge valve 200 includes an occlusion member 240, a biased member 230, a washer 220 and an adjustable member 210. The occlusion member 240 can be any suitable structure configured to fit within the second end portion 286 of the lumen 282 when in a first position but define a pneumatic passage through the lumen when in a second position, as described in further detail herein. Similarly stated, the occlusion member 240 can be any suitable structure that occludes and/or pneumatically seals the second end portion 286 of the lumen when in the first position but does not occlude and/or pneumatically seal the second end portion 286 of the lumen when in the second position. As shown in FIGS. 3-5 and 7, the occlusion member 240 can be a sphere having a diameter greater than the width W2 of the second end portion 286 of the lumen 282. In such embodiments, a portion of the sphere extends into the second end portion 286 of the lumen 282 (FIG. 5). In other embodiments, the occlusion member 240 can be any other shape and/or structure, such as a rectangular prism, an ovoid, a pyramid, and/or the like.

Figure 7:
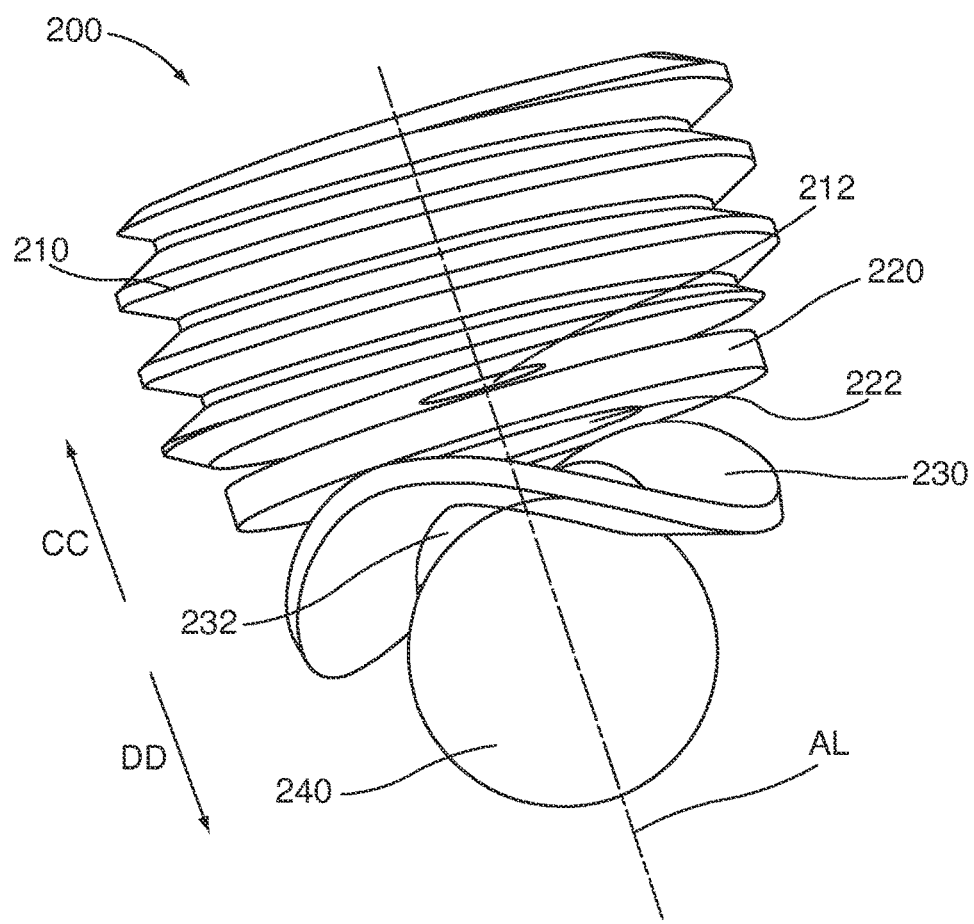
FIG. 7 is a side perspective view of the purge valve shown in FIG. 3.

The biased member 230 can be any structure configured to bias the occlusion member 240 in its first position. Similarly stated, the biased member 230 can be any structure configured to retain the occlusion member 240 within the second end portion 286 of the lumen 282 when a pressure within the cavity of the housing 280 is below a pressure threshold. As shown in FIGS. 3, 5 and 7, the biased member 230 can be a wave washer. As shown in FIG. 7, such a wave washer can define a lumen 232 configured to receive a portion of the occlusion member 240. In such embodiments, the lumen 232 can have a width smaller than a width of the occlusion member 240. As such, a portion of the occlusion member 240 can be received by the lumen 232 when a pressure within the cavity is greater than a pressure threshold, as described in further detail herein. Additionally, in such embodiments, because of the wave structure of the biased member 230, a first portion of an inner surface of the biased member 230 contacts the occlusion member 240 while a second portion of the inner surface of the biased member 230 does not contact the occlusion member 240. The lumen 232 can facilitate the retention of the occlusion member 240 in substantial alignment with the second end portion 286 of the lumen 282 when the occlusion member 240 is in the second position.

In other embodiments, the biased member can be any other suitable structure. Accordingly, the biased member 230 can exert a force on the occlusion member 240 such that the occlusion member is biased in its first position. In some embodiments, for example, the biased member can be one or more springs, a flexible lock washer, and/or the like.

In some embodiments, the biased member 230 has a first position and a second position, corresponding to the first position and the second position of the occlusion member 240. Accordingly, when the occlusion member 240 is moved from its first position to its second position, the occlusion member 240 moves the biased member 230 from its first position to its second position. Similarly, when the biased member 230 moves from its second position to its first position, the biased member 230 moves the occlusion member 240 from its second position to its first position.

The washer 220 can be any suitable washer to be disposed between the biased member 230 and the adjustable member 210. In some embodiments, and as shown in FIG. 7, the washer defines a lumen 222. The lumen of the washer 220 is aligned with the lumen of the biased member 230, as described in further detail herein. In other embodiments, the purge valve does not include a washer. In such embodiments, the biased member can directly contact the adjustable member.

The adjustable member 210 can be any suitable member disposed within the lumen 282. The adjustable member 210 is coupled to the first end portion 284 of the lumen 282. More specifically, the adjustable member 210 is coupled to the lumen 282 such that an end portion of the adjustable member 210 is disposed within the lumen 282 a distance. Accordingly, the adjustable member 210 retains the washer 220, the biased member 230 and the occlusion member 240 within the lumen 282 when the adjustable member 210 is coupled to the first end portion 284 of the lumen 282.

As discussed above, the adjustable member 210 can be removably coupled to the first end portion 284 of the lumen 282 using any suitable coupling portion and/or mechanism. In some embodiments, for example, the adjustable member 210 includes a threaded portion configured to matingly engage a threaded portion of the lumen 280. In other embodiments, any other suitable coupling mechanism can be used to removably couple the adjustable member 210 to the first end portion 284 of the lumen 282.

The adjustable member 210 defines a lumen 212. In some embodiments, the lumen 212 is configured to pneumatically couple the cavity of the housing 280 with the volume surrounding the housing 280 when the occlusion member 240 is in its second position. Accordingly, when the occlusion member 240 is in its second position, the lumen 212 of the adjustable member 210 is part of an air passage and/or a pneumatic path defined between the cavity of the housing 280 and the volume surrounding and/or outside the housing 280, as described in further detail herein.

The lumen 282 of the housing 280 defines a longitudinal axis $A_L$ (FIGS. 5 and 7). As shown in FIGS. 5 and 7, the adjustable member 210, the washer 220, the biased member 230 and the occlusion member 240 are substantially aligned along the longitudinal axis $A_L$ within the lumen 282. More specifically, the lumen 212 of the adjustable member 210, the lumen 222 of the washer 220, the lumen 232 of the biased member, and a center portion of the occlusion member 240 are substantially aligned along the longitudinal axis $A_L$.

In use, the purge valve 200 is assembled by placing the occlusion member 240, the biased member 230, the washer 220 and the adjustable member 210 into the lumen 282 defined by the housing 280, as shown in FIG. 5. Specifically, the occlusion member 240 can be disposed within the lumen 282 such that the occlusion member 240 is partially disposed within the second end portion 286 of the lumen 282. The biased member 230 can then be placed in the lumen 282 such that the biased member contacts and/or abuts the occlusion member 240. The washer 220 can be placed on top of and/or contacting the biased member 230 and the adjustable member 210 can be releasably coupled to the first end portion 284 of the lumen 282. In some embodiments, for example, the adjustable member 210 can be screwed into the lumen until the occlusion member 240 is tightly disposed within the second end portion 286 of the lumen 282. As described in further detail herein, in some embodiments, the predetermined pressure within the cavity at which the occlusion member 240 moves from its first position to its second position can be adjusted by the distance the adjustable member 210 extends within the lumen 282 of the housing 280.

After the purge valve 200 is disposed and/or assembled within the lumen 282, electrodes and/or electrolyte can be placed and/or inserted within the cavity (not shown) of the housing 280. In other embodiments, the electrodes and/or electrolyte can be placed and/or inserted within the cavity of the housing 280 prior to placing and/or assembling the purge valve 200 within the lumen 282. After the purge valve 200 is disposed and/or assembled within the lumen 282 and the electrodes and/or electrolyte are placed within the cavity of the housing 280 (e.g., to assemble one or more capacitors), an anode and a cathode electrically coupled to the electrodes can be coupled to a load and the energy storage device can begin to operate and/or function (e.g., by providing power to the load).

During normal operation, the purge valve 200 remains in its first position. Similarly stated, the biased member 230 exerts a force on the occlusion member 240 in the direction shown by the arrow DD in FIGS. 5 and 7 such that the occlusion member 240 is retained within the second end portion 286 of the lumen 282 (e.g., FIG. 5). Accordingly, the cavity of the housing 280 (and thus the electrodes and the electrolyte) are pneumatically isolated from the volume surrounding the housing 280. Thus, pressure can build-up, accumulate and/or increase within the cavity.

If the pressure within the cavity of the housing 280 rises and/or increases above a first predetermined pressure threshold, the pressure within the cavity exerts a force on the occlusion member 240 in the direction shown by the arrow CC in FIGS. 5 and 7 greater than the force exerted on the occlusion member 240 by the biased member 230 in the direction shown by the arrow DD in FIGS. 5 and 7. Accordingly, the force exerted on the occlusion member 240 by the pressure in the cavity causes the occlusion member 240 to move in the direction shown by the arrow CC. This movement breaks the pneumatic seal between the occlusion member 240 and the second end portion 286 of the lumen 282. Similarly stated, this movement causes an air passage and/or a pneumatic path to be defined from the cavity to the volume surrounding and/or outside the housing 280. More specifically, the lumen 212 of the adjustable member 210, the lumen 222 of the washer 220, the lumen of the biased member 230 and the second end portion 286 of the lumen 282 define an air passage and/or a pneumatic path between the cavity and the volume surrounding and/or outside the housing 280. Via the air passage and/or the pneumatic path, the pressure within the cavity of the housing 280 can be reduced and/or released.

While in its second position, the occlusion member 240 can remain aligned with the second end portion 286 of the lumen 282 along the longitudinal axis $A_L$ because of the lumen 232 of the biased member 230. More specifically, when the occlusion member 240 is moved into its second position, a portion of the occlusion member 240 is received by the lumen 232 of the biased member 230. Because the lumen 232 of the biased member 230 is substantially aligned with the second end portion 286 of the lumen 282, this helps to ensure that the occlusion member 240 remains substantially aligned with the second end portion 286 of the lumen 282 when in its second position.

After the pressure within the cavity of the housing 280 is reduced below a second predetermined pressure threshold, the force exerted by the pressure within the cavity on the occlusion member 240 in the direction shown by the arrow CC is less than the force exerted on the occlusion member 240 by the biased member 230 in the direction shown by the arrow DD. Accordingly, the force exerted on the occlusion member 240 by the biased member 230 causes the occlusion member 240 to move from its second position to its first position. Similarly stated, the pneumatic seal between the occlusion member 240 and the second end portion 286 of the lumen 282 can be reformed. Thus, the electrodes and the electrolyte disposed within the cavity of the housing 280 are once again pneumatically isolated.

In some embodiments, the tapered portion 288 assists the biased member 230 in moving the occlusion member 240 from its second position to its first position. More specifically, the tapered portion 288 helps direct and/or guide the occlusion member 240 into the second end portion 286 of the lumen 282. For example, if the occlusion member 240, when in its second position, is not exactly aligned with the second end portion 286 of the lumen 282, when the biased member 230 moves the occlusion member 240 in the direction of the second end portion 286 of the lumen 282 (e.g., the direction shown by the arrow DD), the occlusion member 240 can slide along the tapered portion 288 and into the second end portion 286 of the lumen 282. Accordingly, the tapered portion 288 assists the occlusion member 240 in redefining the pneumatic seal with the second end portion 286 of the lumen 282.

In some embodiments, the second predetermined pressure threshold can be substantially equal to the first predetermined pressure threshold. In such embodiments, the occlusion member 240 moves from its first position to its second position and from its second position to its first position at the same predetermined pressure threshold. In other embodiments, the second predetermined pressure threshold is less than the first predetermined pressure threshold. This allows the pressure within the cavity to fall a predetermined amount of pressure below the first predetermined pressure threshold before the purge valve 200 is moved from its second position to its first position. Such embodiments can be said to have a hysteric effect. In such embodiments, the amount of force it takes to move the occlusion member 240 (in the direction shown by the arrow CC or the direction shown by the arrow DD) is greater than the amount of force it takes to retain the occlusion member 240 in its current position (the first position or the second position). As such, the first predetermined pressure threshold (i.e., the pressure within the cavity needed to move the occlusion member 240 from its first position to its second position) is greater than the second predetermined threshold (i.e., the pressure within the cavity needed for the force exerted on the occlusion member 240 by the biased member 230 to move the occlusion member 240 from its second position to its first position). Such a hysteric effect helps to ensure that the purge valve 200 is not frequently moving between its first position and its second position. Similarly stated, in such embodiments, after the occlusion member 240 is moved from its second position to its first position, the pressure within the cavity can increase an amount before the occlusion member 240 again moves from its first position to its second position.

In some embodiments, the first predetermined threshold and/or the second predetermined threshold can be adjusted, calibrated and/or modified. For example, the amount of force applied by the biased member 230 on the occlusion member 240 (i.e., in the direction shown by the arrow DD in FIG. 7) can be adjusted, calibrated and/or modified. In some embodiments, for example, the adjustable member 210 can be tightened or loosened. More specifically, the adjustable member 210 can be moved with respect to the housing 280 in the direction shown by the arrow CC or in the direction shown by the arrow DD. Accordingly, the distance that an end portion of the adjustable member extends into the lumen 282 can be varied. Such tightening or loosening can reduce or increase the amount of space between the washer 220 and the occlusion member 240, respectively.

For example, if the adjustable member 210 is tightened such that it moves in the direction shown by the arrow DD in FIGS. 5 and 7, the space between the washer 220 and the occlusion member 240 decreases. This causes the biased member 230 to apply a greater force on the occlusion member 240. Accordingly, the pressure within the cavity of the housing 280 must apply a greater force on the occlusion member 240 to overcome and/or exceed the force applied by the biased member 230 on the occlusion member 240 and move the occlusion member 240 from its first position to its second position. Thus, the first predetermined threshold is increased. In some embodiments, such tightening of the adjustable member 210 can similarly increase the second predetermined threshold.

Similarly, if the adjustable member is loosened such that it moves in the direction shown by the arrow CC in FIGS. 5 and 7, the space between the washer 220 and the occlusion member 240 increases. This causes the biased member 230 to apply a lesser force on the occlusion member 240. Accordingly, the pressure within the cavity of the housing 280 need only apply a lesser force on the occlusion member 240 to overcome and/or exceed the force applied by the biased member 230 on the occlusion member 240 and move the occlusion member 240 from its first position to its second position. Thus, the first predetermined threshold is decreased. In some embodiments, such loosening of the adjustable member 210 can similarly decrease the second predetermined threshold.

In some embodiments, additional washers 220 and/or biased members 230 can be used to increase the first predetermined threshold and/or the second predetermined threshold. For example, by adding additional washers 220 between the adjustable member 210 and the biased member 230, the distance between the biased member 230 and the second end portion 286 of the lumen 282 decreases. Thus, the biased member 230 is further compressed between the washers 220 and the second end portion 286 of the lumen 282, causing the biased member 230 to exert a greater force on the occlusion member 240 in the direction shown by the arrow DD. Accordingly, a greater pressure within the cavity of the housing 280 is needed to overcome and/or exceed the force exerted on the occlusion member 240 by the biased member 230. Thus, the first predetermined threshold is increased.

In some embodiments, adding additional washers 220 can similarly increase the second predetermined threshold. As discussed in more detail herein, the design specifications of the biased member 230 influences the pressure threshold at which the occlusion member 240 moves between its first and second positions. In other words, the stiffness of the biased member can be chosen to define the desired pressure threshold. Additionally, a combination of various materials can be used to define the pressure threshold. In other words, the stiffness of the occlusion member 240, the washer 220 and the biased member 230 can be taken into account when configuring the valve to be responsive to a predetermined pressure threshold.

Similarly, adding additional biased members 230 between the washer 220 and the occlusion member 240 increases the force exerted on the occlusion member 240 by the biased members 230. Adding additional biased members 230 decreases the distance between the biased members 230 and the second end portion 286 of the lumen 282 and increases the stiffness of the biased members 230. Accordingly, a greater pressure within the cavity of the housing 280 is needed to overcome and/or exceed the force exerted on the occlusion member 240 by the biased members 230. Thus, the first predetermined threshold is increased. In some embodiments, adding additional biased members 230 can also increase or decrease the second predetermined threshold. For example, a purge valve 200 with one biased member can provide a first predetermined threshold of 100 psi and a second predetermined threshold of 115 psi. By adding a second biased member, the first predetermined threshold is increased to 103 psi and the second predetermined threshold is decreased to 110 psi. In other embodiments, replacing the biased member 230 with a stiffer and/or less elastic biased member can increase the first predetermined threshold and/or the second predetermined threshold. Similarly, replacing the biased member 230 with a more elastic biased member can decrease the first predetermined threshold and/or the second predetermined threshold. Thus, the purge valve 200 can be customized to operate at any range of pressures simply by changing the number of washers and/or biased members or by selecting washers and/or biased members with certain material properties to achieve the desired pressure range.

In some embodiments, the pressure within the cavity of the housing 280 can be manually relieved. For example, a user of the device can loosen the adjustable member 210 from the lumen 282 of the housing 280 such that the biased member 230 no longer retains the occlusion member 240 within the second end portion 286 of the lumen 280. More specifically, the adjustable member 210 can be moved in the direction shown by the arrow CC in FIGS. 5 and 7 until the biased member 230 no longer applies a sufficient force on the occlusion member 240 to retain the occlusion member 240 within the second end portion 286 of the lumen 280. This allows the pneumatic seal between the occlusion member 240 and the second end portion 286 of the lumen 280 to break and an air passage and/or a pneumatic path to be defined within the second end portion 286 of the lumen 280. The pressure within the cavity can be released and/or reduced via the pneumatic path. In some embodiments, the cavity can be manually resealed (e.g., the occlusion member 240 moved to its first position) by tightening the adjustable member 210 such that the adjustable member 210 moves in the direction shown by the arrow DD in FIGS. 5 and 7.

Figure 8:
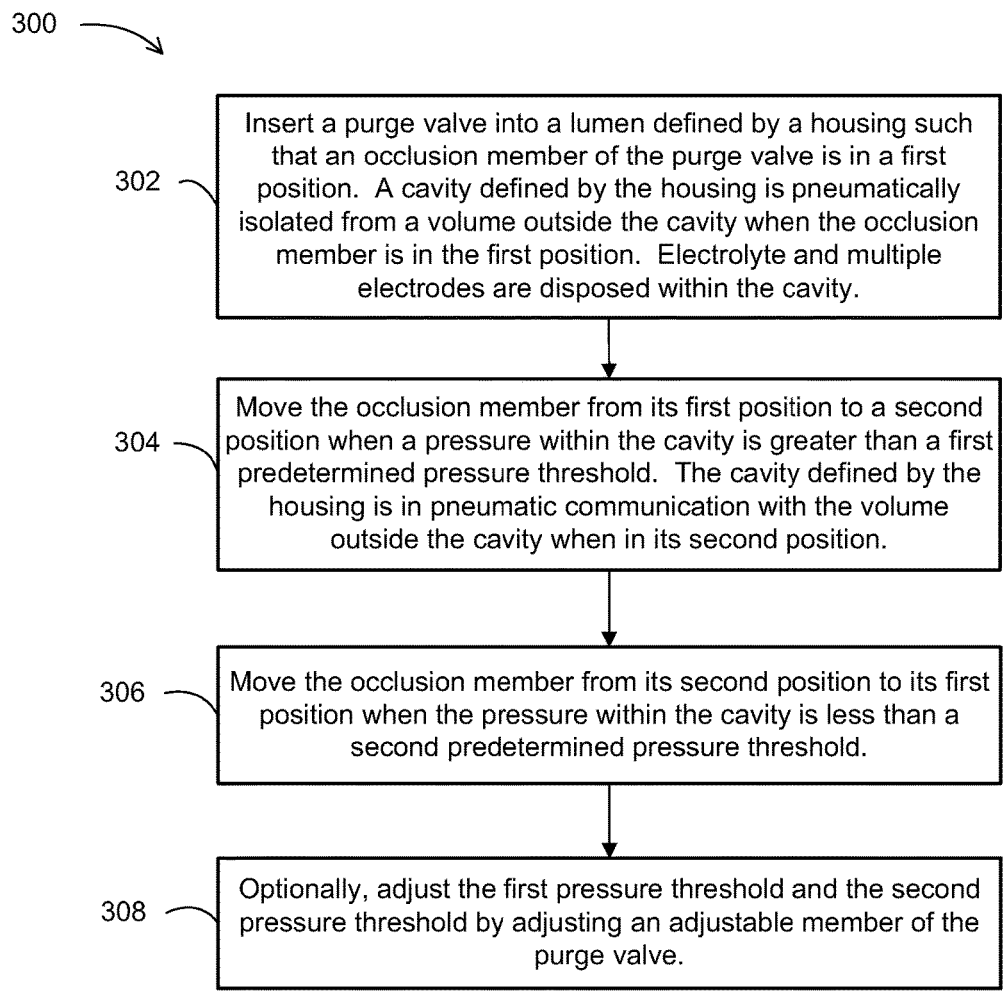
FIG. 8 is a flow chart illustrating a method of releasing pressure within a housing of an energy storage device, according to another embodiment.

FIG. 8 is a flow chart illustrating a method 300 of regulating (i.e., maintaining and/or releasing) pressure within a housing of an energy storage device, according to another embodiment. The method 300 includes inserting a purge valve into a lumen defined by a housing such that an occlusion member of the purge valve is in a first position, at 302. A cavity defined by the housing is pneumatically isolated from the volume outside the cavity when the occlusion member is in the first position. Electrolyte and multiple electrodes are disposed within the cavity. The purge valve can be structurally and functionally similar to the purge valve 150 and/or the purge valve 200, shown and described above.

The occlusion member is moved from its first position to a second position when a pressure within the cavity is greater than a first predetermined pressure threshold, at 304. The cavity defined by the housing is in pneumatic communication with the volume outside the cavity when in its second position. Accordingly, the pressure within the cavity can be reduced.

The occlusion member is moved from its second position to its first position when the pressure within the cavity is less than a second predetermined pressure threshold, at 306. Accordingly, the cavity defined by the housing is once again pneumatically isolated from the volume outside the cavity. This allows the electrolyte and the multiple electrodes disposed within the cavity to operate without being exposed to the atmosphere surrounding the housing.

The first pressure threshold and the second pressure threshold are optionally adjusted by adjusting an adjustable member of the purge valve, at 308. As discussed above, such adjustments can increase and/or reduce the force applied to the occlusion member by a biased member of the purge valve. Increasing the force applied to the occlusion member increases the first pressure threshold and/or the second pressure threshold. Decreasing the force applied to the occlusion member decreases the first pressure threshold and/or the second pressure threshold.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A resealable purge valve apparatus for an energy storage device to pneumatically isolate and release pressure from a first volume of a cavity from a second volume outside the cavity, comprising:
a housing defining the cavity and a lumen, the lumen defining a pneumatic path extending from the first volume of the cavity to the second volume outside the cavity,
an occlusion member operably coupled to the housing and movable between a first position, in which the occlusion member obstructs the pneumatic path, and a second position, in which the pneumatic path fluidically couples the first volume of the cavity to the second volume outside the cavity;
a biased member coupled to the occlusion member to bias the occlusion member, wherein the bias member is a washer;
an adjustable member coupled to the biased member to adjust a force applied by the bias member on the occlusion member; and
a semi-permeable material having a porosity and covering an end portion of the lumen, the porosity selected to allow predetermined gases to pass therethrough while being impermeable to liquids, wherein the porosity of semi-permeable material is selected to have an average pore size in a range from 2 microns to 10 microns and a thickness in the range from 0.005 inches to 0.030 inches.

2. The apparatus of claim 1, wherein the semi-permeable material is hydrophobic.

3. The apparatus of claim 1, wherein the semi-permeable material is formulated to resist chemical degradation from contact with an electrolyte.

4. The apparatus of claim 1, wherein the semi-permeable material is made from at least one microporous polytetrafluorethylene sheet.

5. The apparatus of claim 1, wherein the porosity of semi-permeable material is selected to have an average pore size in the range from 5 microns to 10 microns.

6. The apparatus of claim 1, wherein the predetermined gases include oxygen and/or hydrogen.

7. The apparatus of claim 1, wherein a portion of the adjustable member is disposed within the lumen defined by the housing a distance from a first end portion of the lumen, the occlusion member moving from its first position to its second position when a pressure within the cavity is greater than a predetermined pressure, the predetermined pressure varying as the distance varies.

8. The apparatus of claim 1, wherein the washer is a wave washer.

9. The apparatus of claim 8, wherein the biased member is configured to be movable between a first configuration, in which the biased member retains the occlusion member in the first position, and a second configuration.

10. The apparatus of claim 9, wherein the lumen defines a longitudinal axis in substantial alignment with an axis of the biased member and an axis of the occlusion member.

11. The apparatus of claim 9, wherein the biased member moves from its first configuration to its second configuration when the occlusion member moves from its first position to its second position fluidically coupling the first volume of the cavity to the second volume outside the cavity.

12. The apparatus of claim 11, wherein the biased member is selected to define a predetermined pressure threshold within the cavity, wherein the biased member moves from its first configuration to its second configuration in response to a pressure within the cavity applying a greater force to the occlusion member to exceed a force applied by the biased member retaining the occlusion member in its first position.

13. The apparatus of claim 12, wherein the biased member returns to the first configuration when the pressure within the cavity is below the predetermined pressure threshold.

14. The apparatus of claim 1, wherein the occlusion member pneumatically seals the volume within the cavity from the volume outside the cavity when the occlusion member is in the first position.

15. The apparatus of claim 1, wherein the occlusion member is substantially round.

16. The apparatus of claim 1, wherein at least one electrochemical double layer capacitor is disposed within the cavity.

17. A resealable purge valve apparatus for an energy storage device to pneumatically isolate and release pressure from a volume defined by a housing from a volume outside the housing, comprising:
- an occlusion member at least partially disposed within a lumen, the occlusion member to pneumatically isolate the volume defined by the housing from the volume outside the housing when in a first position, the occlusion member movable from its first position to its second position when a pressure within the volume defined by the housing rises above a predetermined pressure;
- at least one biased member disposed adjacent the occlusion member and to bias the occlusion member in the first position, the at least one biased member configured to move the occlusion member from its second position to its first position when the pressure within the volume falls below the predetermined pressure, wherein the at least one biased member is at least one washer;
- a retaining member to keep the occlusion member and the at least one biased member within the lumen, wherein the retaining member is adjustable to modify the predetermined pressure at which the at least one biased member is configured to move the occlusion member from its second position to its first position when the pressure within the volume falls below the predetermined pressure; and
- at least one semi-permeable material having an average pore size in the range from 2 microns to 10 microns, and a thickness in the range from 0.005 inches to 0.030 inches, and disposed within the lumen to allow gases to pass therethrough while being impermeable to liquids,
- wherein the volume defined by the housing is in pneumatic communication with the volume outside the housing via the lumen when the occlusion member is in a second position.

18. The apparatus of claim 17, wherein at least one electrochemical double layer capacitor is disposed within the volume defined by the housing.

19. The apparatus of claim 17, wherein the retaining member, the at least one biased member, and the at least one semi-permeable material are substantially coaxial.

20. The apparatus of claim 17, wherein the retaining member includes a threaded portion to releasably couple the retaining member to the housing.

21. The apparatus of claim 17, wherein the at least one washer is at least one wave washer.

22. The apparatus of claim 17, wherein the at least one washer is at least one lock washer.

23. The apparatus of claim 1, wherein the washer is a lock washer.

24. A resealable purge valve apparatus for an energy storage device to pneumatically isolate and release pressure from a volume defined by a housing from a volume outside the housing, comprising:
- an occlusion member partially disposed within a lumen, the occlusion member to pneumatically isolate the volume defined by the housing from the volume outside the housing when in a first position, the occlusion member movable from its first position to its second position when a pressure within the volume defined by the housing rises above a predetermined pressure;
- a biased member disposed adjacent the occlusion member to bias the occlusion member in the first position, the biased member configured to move the occlusion member from its second position to its first position when the pressure within the volume falls below the predetermined pressure, wherein the biased member is a washer;
- an adjustable retaining member to keep the occlusion member and the biased member within the lumen, the adjustable retaining member configured to modify a force applied by the biased member on the occlusion member, and
- at least one semi-permeable material disposed within the lumen to allow gases to pass therethrough while being impermeable to liquids, the at least one semi-permeable material being selected to have a thickness in the range from 0.005 inches to 0.030 inches,
- wherein the volume defined by the housing is in pneumatic communication with the volume outside the housing via the lumen when the occlusion member is in a second position.

25. The apparatus of claim 24, wherein the washer is a wave washer.

26. The apparatus of claim 24, wherein the washer is a lock washer.

* * * * *